United States Patent
Ma et al.

(10) Patent No.: US 10,088,600 B2
(45) Date of Patent: Oct. 2, 2018

(54) WEATHER RECOGNITION METHOD AND DEVICE BASED ON IMAGE INFORMATION DETECTION

(71) Applicant: BEIJING UNIVERSITY OF POSTS AND TELECOMMUNICATIONS, Beijing (CN)

(72) Inventors: Huadong Ma, Beijing (CN); Huiyuan Fu, Beijing (CN); Zheng Zhang, Beijing (CN)

(73) Assignee: BEIJING UNIVERSITY OF POSTS AND TELECOMMUNICATIONS, Beijing (CN)

(*) Notice: Subject to any disclaimer, the term of this patent is extended or adjusted under 35 U.S.C. 154(b) by 277 days.

(21) Appl. No.: 14/845,859

(22) Filed: Sep. 4, 2015

(65) Prior Publication Data
US 2016/0334546 A1 Nov. 17, 2016

(30) Foreign Application Priority Data
May 14, 2015 (CN) .......................... 2015 1 0247015

(51) Int. Cl.
*G01W 1/00* (2006.01)
*G06K 9/00* (2006.01)
*G06K 9/46* (2006.01)
*G06K 9/62* (2006.01)

(52) U.S. Cl.
CPC .......... *G01W 1/00* (2013.01); *G06K 9/00664* (2013.01); *G06K 9/4642* (2013.01); *G06K 9/6269* (2013.01)

(58) Field of Classification Search
None
See application file for complete search history.

(56) References Cited

U.S. PATENT DOCUMENTS

2014/0355879 A1* 12/2014 Agosta .............. G06K 9/00791
382/170

OTHER PUBLICATIONS

Chen, Zichong, et al. "How is the Weather: Automatic Inference from Images." Image Processing (ICIP), 2012 19th IEEE International Conference on. (pp. 1853-1856) IEEE, Oct. 3, 2012.

* cited by examiner

*Primary Examiner* — Cory Eskridge
(74) *Attorney, Agent, or Firm* — Norton Rose Fulbright US LLP

(57) ABSTRACT

The invention relates to a weather recognition method and device based on image information detection, including: obtaining an image extracting multiple first image features of the image with respect to each preset type of weather using a number of first preset algorithms preset correspondingly for different preset types of weather; inputting the multiple first image features to a preset multi-kernel classifier, the multi-kernel classifier performing classification according to the image features to identify the weather in which the image was taken. The multi-kernel classifier is realized by: selecting a first preset number of image samples for each of the preset types of weather; for the image samples of this type of weather, extracting the first image features of each image sample according to the first preset algorithm corresponding to this preset type of weather; and performing machine learning for the first image features according to a preset multi-kernel learning algorithm.

5 Claims, 4 Drawing Sheets

WEATHER RECOGNITION METHOD AND DEVICE BASED ON IMAGE INFORMATION DETECTION

CROSS-REFERENCE TO RELATED APPLICATIONS

This application claims the benefit of Chinese Application No. 201510247015.2, filed May 14, 2015. The contents of the referenced application are incorporated herein by reference.

TECHNICAL FIELD

The present invention relates to the technical field of image processing, and particularly to a weather recognition method and device based on image information detection.

BACKGROUND

In the field of computer vision, image features of an image must be accurately extracted to obtain better processing results. However, in actual applications, due to the effect of weather etc., even the image of a same object taken in different weather appears to have different image features. Refer to FIG. 1, which shows four images of Tiananmen taken on a clear day, a smoggy day, a rainy day and a snowy day respectively.

In prior art, during the extraction of the image features of the four images mentioned above, a same image feature extraction method is generally applied to extract the image features without considering the effect of weather in which the image was taken on the image feature extraction. This may sometimes lead to failure of the image feature extraction and further affect subsequent various computer vision applications dependent on the results of the image feature extraction.

Therefore, in order to improve the image feature extraction and to be able to extract image features with respect to the weather in which the image was taken, it is necessary to identify the weather in which the image was taken before extracting image features.

SUMMARY

The embodiments of the present invention disclose a weather recognition method and device based on image information detection to identify the weather in which the image was taken and therefore to facilitate the corresponding processing in further applications according to the identified weather.

To achieve the object mentioned above, an embodiment of the present invention discloses a weather recognition method based on image information detection, which includes:

obtaining an image to be detected;

extracting multiple first image features of the image to be detected with respect to each preset type of weather according to a number of first preset algorithms preset correspondingly for different preset types of weather;

inputting the extracted multiple first image features to a preset multi-kernel classifier, the multi-kernel classifier performing classification according to the inputted image features to identify the weather in which the image to be detected was taken;

wherein the multi-kernel classifier is a classifier for the preset types of weather realized by: selecting a first preset number of image samples for the different preset types of weather in which the image to be detected was taken respectively; and for the image samples of each preset type of weather respectively, extracting the first image features of each image sample according to the first preset algorithm which corresponds to this preset type of weather; and performing machine learning for the extracted first image features according to a preset multi-kernel learning algorithm.

In a specific implementation of the present invention, the preset types of weather include at least one of the following: clear day, rainy day, snowy day and smoggy day.

In a specific implementation of the present invention, after obtaining the image to be detected, the method further includes:

obtaining second image features of the image to be detected with respect to image contrast and/or image saturation according to second preset algorithms;

the multi-kernel classifier is realized by:

selecting the first preset number of image samples for the different preset types of weather in which the image to be detected was taken respectively; and for the image samples of each preset type of weather respectively, extracting the first image features of each image sample according to the first preset algorithm which corresponds to this preset type of weather;

obtaining the second image features of each of the selected image samples with respect to image contrast and/or image saturation, respectively, according to the second preset algorithms;

performing machine learning for the extracted first image features and for the obtained second image features according to the preset multi-kernel learning algorithm to realize the multi-kernel classifier for the preset types of weather.

In a specific implementation of the present invention, extracting image features of the image to be detected with respect to the clear day in the case that the preset types of weather comprise the clear day includes:

detecting a sky area in the image to be detected;

extracting color information of the detected sky area;

generating image features of a preset first dimension according to the extracted color information;

determining the image features of the image to be detected with respect to the clear day according to the image features of the preset first dimension.

In a specific implementation of the present invention, the weather recognition method based on image information detection further includes:

detecting a shaded area in the image to be detected;

selecting a second preset number of shaded areas from the detection results, wherein the second preset number is equal to the number of shaded areas contained in a pre-built set of shaded areas, which is built based on the pre-selected shaded areas with strong contrast;

searching the pre-built set of shaded areas for an adjacent shaded area of each selected shaded area;

calculating the average distance between the selected shaded area and the searched adjacent shaded area thereof;

generating image features of a preset second dimension according to the calculated average distance;

the determining the image features of the image to be detected with respect to the clear day according to the image features of the preset first dimension includes:

determining the image features of the image to be detected with respect the clear day according to the image features of the preset first dimension and the image features of the preset second dimension.

In a specific implementation of the present invention, extracting image features of the image to be detected with respect to the rainy day in the case that the preset types of weather comprise the rainy day includes:

obtaining high-frequency component information of the image to be detected according to a preset guided-filtering algorithm;

performing a binarization processing for the obtained high-frequency component information;

extracting HOG, Histogram of Oriented Gradient, features of the high-frequency component information after the binarization processing;

matching templates in a preset HOG template set with the extracted HOG features according to a preset template sliding rule to obtain respective matching degrees;

selecting HOG features corresponding to a third preset number of matching degrees from the extracted HOG features according to the matching results based on a descending order in which the matching degrees are arranged;

generating image features of a preset third dimension according to the selected HOG features;

determining the image features of the image to be detected with respect to the rainy day according to the image features of the preset third dimension.

In a specific implementation of the present invention, extracting image features of the image to be detected with respect to the snowy day in the case that the preset types of weather comprise the snowy day includes:

detecting pixels constituting a snowflake in the image to be detected;

generating image features of a preset fourth dimension according to the detected pixels constituting a snowflake;

determining the image features of the image to be detected with respect to the snowy day according to the image features of the preset fourth dimension;

wherein, the detecting the pixels constituting a snowflake in the image to be detected includes:

detecting whether the grayscale value of a target pixel in the image to be detected is greater than the sum of the average grayscale value of the image to be detected and a preset grayscale threshold value;

if yes, judging whether the grayscale value of the target pixel satisfies the following relationship:

the grayscale value of a pixel whose distance from the target pixel is smaller than or equal to $\sqrt{2}N$ equals to the grayscale value of the target pixel, and the grayscale value of a pixel whose distance from the target pixel is larger than $\sqrt{2}N$ and smaller than or equal to $2\sqrt{2}N$ does not equal to the grayscale value of the target pixel, wherein N is a positive integer;

if the relationship above is satisfied, the target pixel is considered to be a pixel constituting a snowflake in the image to be detected;

if the relationship above is not satisfied, the target pixel is considered not to be a pixel constituting a snowflake in the image to be detected.

In a specific implementation of the present invention, extracting image features of the image to be detected with respect to the smoggy day in the case that the preset types of weather comprise the smoggy day includes:

adjusting the size of the image to be detected according to a preset scale;

dividing the size-adjusted image into image blocks of a preset size;

obtaining dark channel information of each image block;

generating image features of a preset fifth dimension according to the obtained dark channel information;

determining the image features of the image to be detected with respect to the smoggy day according to the image features of the preset fifth dimension.

In a specific implementation of the present invention, generating image features of a preset fifth dimension according to the obtained dark channel information includes:

calculating the mean of the dark channel information of each image block according to the obtained dark channel information;

generating the image features of the preset fifth dimension according to the mean of the dark channel information of each image block.

To achieve the object mentioned above, an embodiment of the present invention discloses a weather recognition device based on image information detection, which includes:

an image obtainment module, which is used to obtain an image to be detected;

an image feature extraction module, which is used to extract multiple first image features of the image to be detected with respect to each preset type of weather according to a number of first preset algorithms preset correspondingly for different preset types of weather;

a shooting weather determination module, which is used to input the extracted multiple first image features to a preset multi-kernel classifier, the multi-kernel classifier performing classification according to the inputted image features to identify the weather in which the image to be detected was taken;

wherein the multi-kernel classifier is a classifier for the preset types of weather realized by: selecting a first preset number of image samples for the different preset types of weather in which the image was taken respectively; and for the image samples of each preset type of weather respectively, extracting the first image features of each image sample according to the first preset algorithm which corresponds to this preset type of weather; and performing machine learning for the extracted first image features according to a preset multi-kernel learning algorithm.

From above, in the solutions provided in the embodiments of the present invention, the classifier for the preset types of weather is realized in advance by: selecting the first preset number of image samples for the different preset types of weather in which the image was taken respectively; for the image samples of each preset type of weather respectively, extracting the first image features of each image sample according to the first preset algorithm which corresponds to this preset type of weather; and performing machine learning for extracted first image features according to the preset multi-kernel learning algorithm. Therefore, the weather in which the image to be detected was taken can be identified according to the above-mentioned classifier after the image features of the image to detected with respect to each preset type of weather are extracted. Thus, it can facilitate the corresponding processing in further applications according to the identified weather.

BRIEF DESCRIPTION OF THE DRAWINGS

In order to describe the technical solutions in the embodiments of the present invention or in prior art more clearly, appended drawings required for describing the embodiments of the present invention or in prior art will be briefly described below. Obviously, the appended drawings described below are only some embodiments of the present invention, and those skilled in the art can obtain other drawings according to these drawings without doing creative works.

DETAILED DESCRIPTION

Technical solutions in the embodiments of the present invention will be described below clearly and completely in combination with the appended drawings of the embodiments of the present invention. Obviously, the described embodiments are only some of the embodiments of the present invention, rather than all of the embodiments. Any other embodiment obtained based on the embodiments of the present invention by those skilled in the art without doing creative works falls into the protection scope of the present invention.

Figure 1:
FIG. 1 is the images of the same object taken in different weather.
Figure 2:
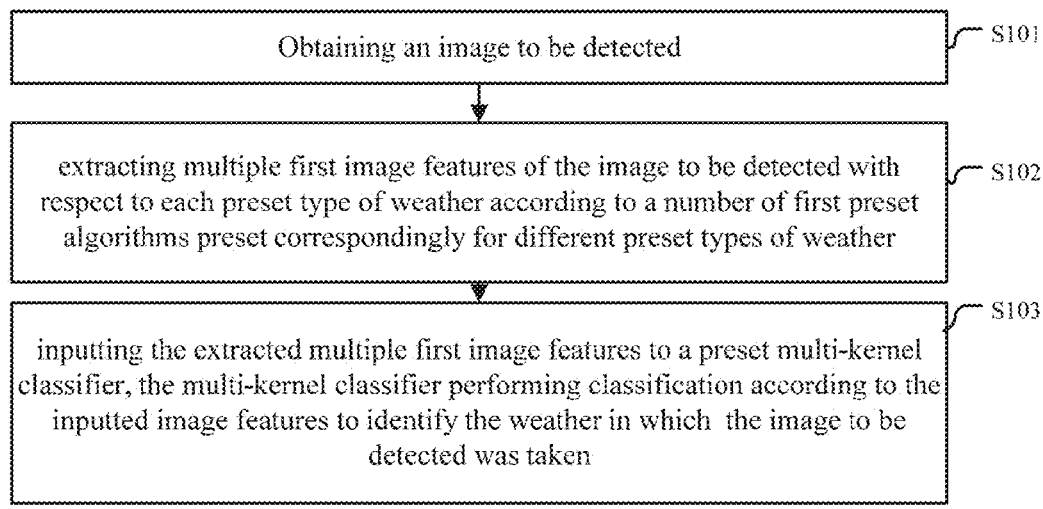
FIG. 2 is a schematic flow diagram of a weather recognition method based on image information detection provided by an embodiment of the present invention.

FIG. 2 is a schematic flow diagram of a weather recognition method based on image information detection provided by an embodiment of the present invention, wherein the method includes:

S101: obtaining an image to be detected.

S102: extracting multiple first image features of the image to be detected with respect to each preset type of weather according to a number of first preset algorithms preset correspondingly for different preset types of weather.

The preset types of weather include at least one of the following: clear day, rainy day, snowy day and smoggy day.

It should be noted that on one hand a cloudy day could be considered as a specific kind of a smoggy day because a cloudy day and a smoggy day have similar features, such as relatively dim light, a gray sky area and the like. On the other hand, a cloudy day can also be considered as a type of weather parallel to clear day, rainy day, snowy day and smoggy day, etc., instead of a specific kind of a smoggy day because there are differences between a cloudy day and a smoggy day, such as a normally higher visibility on a cloudy day than that on a smoggy day. In this case, the preset types of weather can also include cloudy day. The classification of weather is not limited by this application and can be determined according to actual situations in a specific application.

The images taken in different weather have different image features, for example, the images taken on a clear day may include: a blue sky area, a shaded area formed by the light obstructed by an object and the like; the images taken on a rainy day may include: raindrops, rain lines formed by falling raindrops, etc. Therefore, a better image feature extraction result can be obtained if different feature extraction algorithms can be applied for different types of image features during the extraction of image features. In this way, in order to achieve a better result of image feature extraction in practical applications, the feature extraction can be performed by applying different image feature extraction algorithms for different weather.

The specific image feature extraction algorithms used for different weather will be described in detail in the following embodiments.

S103: inputting the extracted multiple first image features to a preset multi-kernel classifier, the multi-kernel classifier performing classification according to the inputted image features to identify the weather in which the image to be detected was taken.

Wherein, the multi-kernel classifier is a classifier for the preset types of weather realized by: selecting a first preset number of image samples for the different preset types of weather in which the image to be detected was taken respectively; and for the image samples of each preset type of weather respectively, extracting first image features of each image sample according to the first preset algorithm which corresponds to this preset type of weather; and performing machine learning for the extracted first image features according to a preset multi-kernel learning algorithm.

In practice, although a user can identify the weather in which the image was taken by directly viewing it, it is necessary for the terminal to analyze the image and the weather in which this image was taken can only be obtained according to the analysis results.

In the solutions provided by this embodiment, image features of the image to be detected with respect to each preset type of weather is extracted so that multiple sets of image features can be obtained. After these image features are inputted into the preset multi-kernel classifier as its input information, the multi-kernel classifier performs classification according to the inputted image features to identify the weather in which the image to be detected was taken.

Specifically, in practice, there is only one actual weather corresponding to the image to be detected. Therefore, in the extraction of image features of the image to be detected with respect to various preset types of weather, among the preset types of weather, the data contained in the image features corresponding to the same type of weather as the weather in which the image to be detected was taken are within a reasonable range while the image features corresponding to other types of weather appear relatively anomalous. In this way, the weather in which the image to be detected was taken can be obtained by the classifier according to the analysis of the values of data contained in these image features after the extracted image features are inputted into the preset multi-kernel classifier.

Preferably, the number of the image features inputted into the preset multi-kernel classifier $Num_1$ is equal to $Num_2$, wherein $Num_2$ is the number of the preset types of weather considered during the generation of the preset multi-kernel classifier. If $Num_1$ is less than $Num_2$, $Num_1$ should be complemented by a preset default value of the image features.

As can be seen from above, in the solutions provided by this embodiment, the classifier for the preset types of weather is realized in advance by: selecting the first preset number of image samples for the different preset types of weather in which the image was taken respectively; for the image samples of each preset type of weather respectively, extracting the first image features of each image sample according to the first preset algorithm which corresponds to this preset types of weather; then performing machine learning for the extracted first image features according to the preset multi-kernel learning algorithm. Therefore, the weather in which the image to be detected was taken can be identified according to the above-mentioned classifier after the image features of the image to detected for each preset type of weather are extracted. Thus, it can facilitate the corresponding processing in further applications according to the identified weather.

Figure 3:
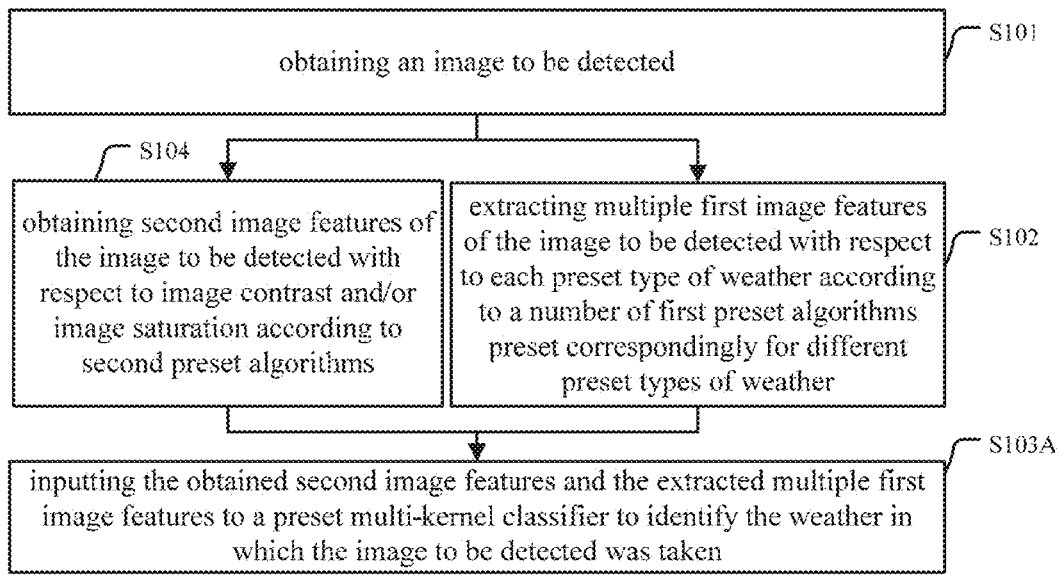
FIG. 3 is a schematic flow diagram of another weather recognition method based on image information detection provided by an embodiment of the present invention.

In another particular implementation of the present invention, referring to FIG. 3, which provides a schematic flow diagram of another weather recognition method based on image information detection. Compared with the embodiment shown in FIG. 2, after obtaining the image to be detected, the method in this embodiment also includes:

S104: obtaining second image features of the image to be detected with respect to image contrast and/or image saturation according to second preset algorithms.

Image contrast is used to indicate the level of difference in luminance between the brightest white and the darkest black in the bright and dark areas of an image. The greater the level of difference, the greater the contrast; vice versa.

When generating an image, the contrast of the image taken is higher under adequate illumination, while it is lower under poor illumination.

Under normal circumstances, the RMS (mean square root) of grayscale value of each pixel in the image to be detected can be used as an image feature with respect to image contrast of this image. Of course, it is just illustrative by way of example in this application, and there are a variety of methods for calculating image contrast in practical applications, for example, Weber contrast, Michelson contrast, etc., which will not be enumerated herein.

Image saturation can reflect the color composition features of an image under different illumination. Image saturation is not related with image brightness.

Specifically, the normalization of saturation $S_{(x,y)}'$ of any pixel of an image I to be detected can be computed by the following expression:

$$S_{(x,y)} = \frac{S'_{(x,y)} - \min(S_I)}{\max(S_I) - \min(S_I)}$$

Wherein, $S_{(x,y)}'$ is the original saturation of the pixel with coordinates of (x, y), $S_{(x,y)}$ is the saturation value of $S_{(x,y)}'$ normalized as mentioned above, max $(S_1)$ represents the maximum original saturation value of the image I to be detected, min $(S_1)$ represents the minimum original saturation value of the image I to be detected.

After the saturation of any pixel in the image to be detected is calculated according to the above expression, it is possible to further obtain the histogram statistics for each pixel's saturation, which can be used as the image feature with respect to saturation of the image to be detected.

In a preferred embodiment of the present invention, the histogram statistics for each pixel's saturation may further be zoned after they are obtained, and the area statistics can be obtained according to the zoning results to obtain statistics of a preset six dimension which can be used as the image feature with respect to image saturation. For example, the preset sixth dimension may be 10, which further reduces the data contained in the image features with respect to image saturation and facilitates the application of the image feature in the following processing.

S103A: inputting the obtained second image features and the extracted multiple first image features to a preset multi-kernel classifier to identify the weather in which the image to be detected was taken.

Specifically, the multi-kernel classifier of the present embodiment can be realized by:

selecting the first preset number of image samples for the different preset types of weather in which the image was taken respectively; and for the image samples of each preset type of weather respectively, extracting the first image features of each image sample according to the first preset algorithm which corresponds to this preset types of weather;

obtaining the second image features of each of the selected image samples with respect to image contrast and/or image saturation respectively according to the second preset algorithms;

performing machine learning for the extracted first image features and the obtained second image features according to the preset multi-kernel learning algorithm to realize the multi-kernel classifier for the preset type of weather.

As can be seen from above, in the solutions provided by the present embodiment, in addition to the influence of the weather type on the image to be detected, image contrast and/or saturation is also taken into account in the recognition of the weather in which the image to be detected was taken. Therefore, more information is provided to identify the weather in which the image to be detected was taken.

The extraction of image features of the image to be detected with respect to various types of weather will be described in detail by way of different embodiments below.

Figure 4:
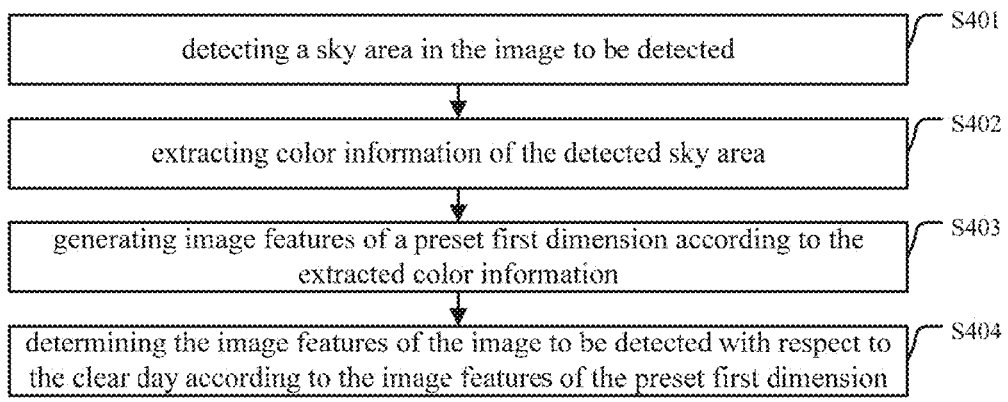
FIG. 4 is a schematic flow diagram of a method for extracting image features with respect to clear day provided by an embodiment of the present invention.

In a specific embodiment of the present invention, referring to FIG. 4, which provides a schematic flow diagram of a method for extracting image features with respect to the clear day, it should be understood that the sky is light blue on a clear day, and the obtained image often contains a sky area.

Regarding the situation mentioned above, in this embodiment, extracting image feature of the image to be detected with respect to the clear day in the case that the preset types of weather comprise the clear day may include:

S401: detecting a sky area in the image to be detected.

In an alternative implementation of the present invention, when detecting a sky area of the image to be detected, firstly the image to be detected can be divided into several small image blocks. e.g., image blocks with a size of 15×15, and then they are detected to see whether each small image block is a sky area.

On a clear day, the sky area is light blue or white and the color within a small area changes continuously and slowly. Therefore, information such as the color values of each pixel and the trend of the color values in each image block and the like may be used to determine whether a small image block is a sky area.

In a particular implementation, the classifier for a sky area is realized in advance by: collecting a number of image samples containing a sky area; extracting image features with respect to the sky area in each image sample according to a preset feature extraction algorithm for sky area; and then performing machine learning for the image features extracted above according to the random forest method. Whether a small image block is a sky area is determined by: extracting the image features of this small image block with respect to the sky area according to the preset image feature extraction algorithm for sky area; inputting the extracted image features into the classifier realized by machine learning; and performing the classification of this small image block according to the inputted image features by the classifier and determining whether it is a sky area.

S402: extracting color information of the detected sky area.

In practical applications, the image can be stored in the format of RGB, YUV, LAB and the like. The color information of a sky area can be represented by either the color values or one or more components of the color values of each pixel in the sky area.

For example: when an image is stored in RGB format, the sky area can be represented by R, G or B components of the color values of each pixel in the sky area;

when an image is stored in YUV format, the sky area can be represented by Y component or by U and V components of the color values of each pixel in the sky area;

when the image is stored in LAB format, the sky area can be represented by A. B components of the color values of each pixel in the sky area.

It should be noted that there are many other types of image storage formats in practical applications, the representation of color information of the sky area are not limited to the several representation mentioned above and can be determined according to the actual situations in specific applications.

S403: generating image features of a preset first dimension according to the extracted color information.

Wherein, the preset first dimension can be determined according to the value range of color values of a pixel. For example in the case of an image in LAB format, the value range of A and B components is [−128,127] which contains 256 integers, thus the preset first dimension can be set to 256.

Moreover, in order to facilitate the statistics and reduce the amount of calculation etc., intervals of the extracted color information can also be combined. In this case, the value of the preset first dimension is usually smaller than the value determined according to the value range of the color values of the pixel. For example, in the case that the value determined according to the value range of color values of the pixel in an image of LAB format is 256, the value of the preset first dimension can be set to 200, 180, 100, 60 etc.

Specifically, in the case that the value range of A and B components is [−128,127] in an image of LAB format, if the preset first dimension is set to 200, it can be understood that the 256 data intervals are divided into 200 data intervals according to certain rules. Statistics can be performed according to the newly divided data intervals and the extracted color information to generate the image features.

S404: determining the image features of the image to be detected with respect to the clear day according to the image features of the preset first dimension.

A shadow will be formed by light obstructed by an object, thus the image taken on a clear day may contain a shaded area in addition to a possible sky area. Regarding this, the image features can also be generated according to the shaded area in addition to the sky area.

In another specific embodiment of the present invention, image features of a preset second dimension can be generated by: detecting a shaded area in the image to be detected; selecting a second preset number of shaded areas from the detection results; searching a pre-built set of shaded areas for an adjacent shaded area of each selected shaded area; calculating the average distance between the selected shaded area and the searched adjacent shaded area thereof, and generating the image features of the preset second dimension according to the calculation result.

Alternatively, K-Nearest Neighbors algorithm can be used to search the pre-built set of shaded areas for the adjacent shaded area of the each selected shaded area. The K-Nearest Neighbors algorithm belongs to the prior art and thus will be omitted herein.

The above-mentioned second preset number is equal to the number of the shaded areas contained in the pre-built set of shaded areas, which is built according to the pre-selected shaded areas with strong contrast.

In order to obtain a better adjacent area of the selected area in practical applications, a number of shaded areas (e.g. 10 shaded areas) with strong contrast between shaded areas and non-shaded areas can be selected according to the experience of a developer, and then the set of shaded areas is built according to the selected shaded areas.

Alternatively, the above-mentioned preset second dimension can be 10.

Of course, the number of the shaded areas contained in the pre-built set of shaded areas and the value of the preset second dimension are not limited by this application.

In an alternative implementation, the shaded area of the image to be detected can be determined by: firstly, performing over-segmentation of the image to be detected to obtain a number of image blocks and image edges of each image block; secondly, filtering the obtained image edges by using an image edge extraction algorithm, such as Canny edge detection algorithm, Sobel edge detection algorithm etc., to obtain the image edges of a relatively high possibility; and then performing the classification of the filtered image edges according to an image edge classifier.

It should be noted that the description above is just illustrative by way of example and the way of detecting a shaded area in the image to be detected is not limited to the above method in the practical applications. In addition, the order of generating image features according to a sky area and that of generating image features according to a shaded area are not limited by this application, and they can be executed in parallel or sequentially. When executed sequentially, the order can be determined according to actual circumstances.

After generating the image features of the first dimension and those of the second dimension, the above-mentioned determining the image features of the image to be detected with respect to the clear day according to the image features of the preset first dimension can be specifically the determining the image features of the image to be detected with respect to the clear day according to the image features of the preset first dimension and those of the preset second dimension.

As can be seen from above, in the solutions provided by above-mentioned various embodiments, the factors such as a sky area on a clear day and the effects of light are fully taken into account when extracting image features with respect to the clear day. Therefore, a better image feature extraction result can be obtained during the extraction of the image features with respect to the clear day due to the targeted performance by implementing the solutions provided by various embodiments.

Figure 5:
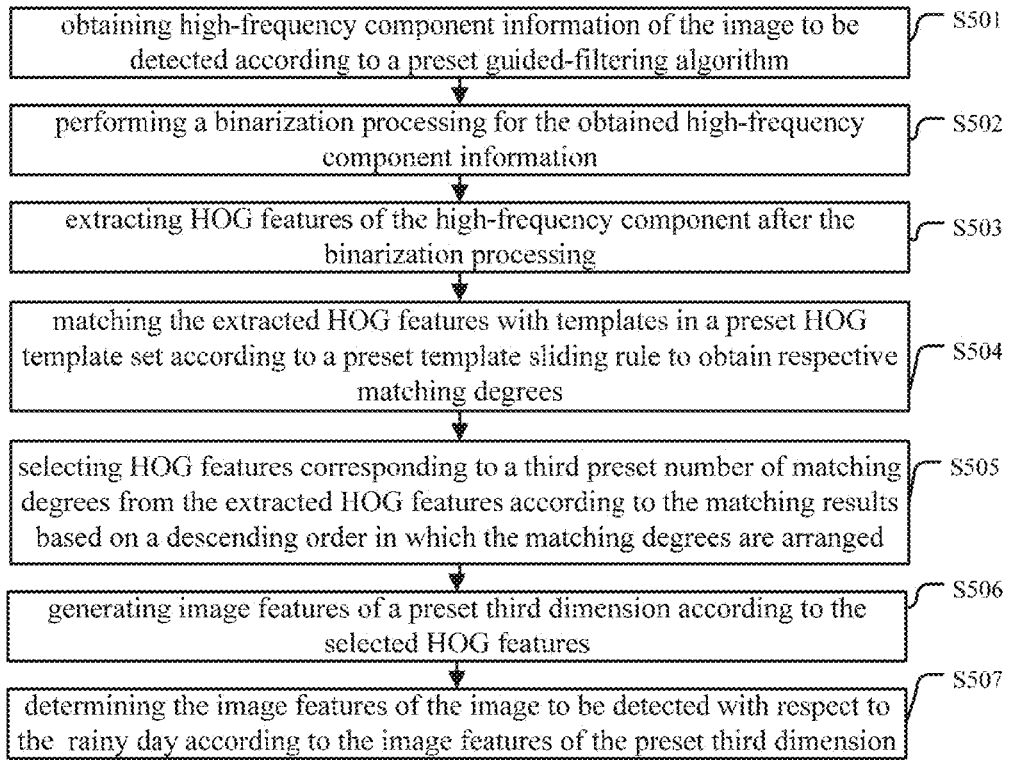
FIG. 5 is a schematic flow diagram of a method for extracting image features with respect to rainy day provided by an embodiment of the present invention.

In another specific embodiment of the present invention, referring to FIG. 5, which provides a schematic flow diagram of a method for extracting image features with respect to the rainy day, it can be understood that the image taken on a rainy day often contains raindrops and rain lines formed by the falling raindrops, and the like, which have characteristics similar to image noises.

Regarding the description above, in this embodiment, extracting image features of the image to be detected with respect to the rainy day in the case that the preset types of weather comprise the rainy day may include:

S501: obtaining high-frequency component information of the image to be detected according to a preset guided-filtering algorithm.

The guided-filtering algorithm is a filtering algorithm that can keep the edges of the image. Compared with traditional filtering algorithms, the guided-filtering algorithm has the following characteristics such as a good real-time performance, a delicate texture of filtered image and a smooth edge.

The input of guided-filtering algorithm is the image to be detected and a guide map, and its output is an image with both edge information of the image and the structure of the guide map.

The image to be detected can be decomposed into high-frequency and low-frequency components by the guided-filtering algorithm, wherein raindrops, rain lines and the edge information of other "non-rain" parts usually remain in the high-frequency component.

S502: performing a binarization processing for the obtained high-frequency component information.

S503: extracting HOG (Histogram of Oriented Gradient) features of the high-frequency component after the binarization processing.

Figure 6:
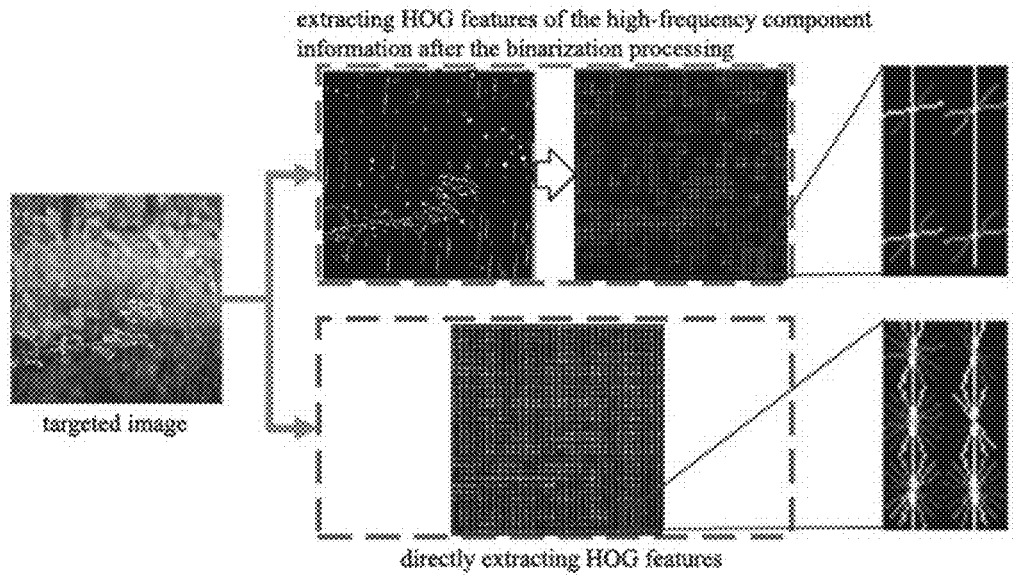
FIG. 6 is a comparison diagram of the directly extracted HOG features of the image to be detected and the extracted HOG features of the high-frequency component information of the image to be detected after a binarization processing.

Referring to FIG. 6, which provides the comparison diagram of the directly extracted HOG features of the image to be detected and the extracted HOG features of the high-frequency component information of the image to be detected after the binarization processing, it can be seen from this figure that the difference between pixels in the remained information after the HOG features of the image to be detected are directly extracted is not obvious, while when the HOG features of the high-frequency component information of the image to be detected are extracted after the binarization processing, the difference between pixels in the remained information are more significant, which facilitates the detection of noises such as raindrops, rain lines and the like in the image to be detected.

S504: matching the extracted HOG features with templates in a preset HOG template set according to a preset template sliding rule to obtain respective matching degrees.

Wherein, the above-mentioned preset template sliding rule may be the rule related to the information such as the unit sliding distance, the sliding direction, etc.

The preset HOG template set may include a number of HOG templates, such as 5, 8, 15 HOG templates, etc., which is not limited by the present application.

Preferably, the template contained in the preset HOG template set may be a HOG template of pure rain from many different angles.

Specifically, the Mahalanobis distance between the template in the preset HOG template set and the corresponding area in the extracted HOG features can be the matching degree therebetween.

S505: selecting HOG features corresponding to a third preset number of matching degrees from the extracted HOG features according to the matching results based on a descending order in which the matching degrees are arranged.

S506: generating image features of a preset third dimension according to the selected HOG features.

Wherein, the preset third dimension can be set according to the circumstances, for example to 180.

S507: determining the image features of the image to be detected with respect to the rainy day according to the image features of the preset third dimension.

As can be seen from above, in the solutions provided by above-mentioned each embodiments, the characteristics of raindrops, rain lines, etc. in an image are fully considered in the extraction of the image features with respect to the rainy day. In addition, the guided filtering and the binarization processing make the difference between the pixels in the information remained after HOG feature extraction significant, which lead to a better image feature extraction for a rainy day. Therefore, a better image feature extraction result can be obtained during the extraction of the image features with respect to the rainy day due to the targeted performance by implementing the solutions provided by various embodiments.

In another specific embodiment of the present invention, which provides a method for extracting image features with respect to the snowy day, it should be understood that the images taken on a snowy day often contain snowflakes. However, it is relatively difficult to determine the trajectory of a snowflake by a number of images taken successively since the snowflake is light and the trajectory of the snowflake is easily changed by the wind into random directions. Although it is relatively difficult to determine the trajectory of the snowflake, the snowflake has features similar to the image noises in an image and the snowflake has a certain size, also the color values of various pixels constituting the snowflake are similar.

Regarding the description above, in this embodiment, when the preset types of weather comprise the snowy day, the image features of the image to be detected with respect to the snowy day can be determined by: detecting pixels constituting a snowflake in the image to be detected, generating image features of a preset fourth dimension according to the detected pixels constituting a snowflake; and determining the image features of the image to be detected with respect to the snowy day according to the image features of the preset fourth dimension.

Specifically, the image features of the preset fourth dimension can be generated according to the above-mentioned detected pixels constituting a snowflake by: for a pixel constituting a snowflake, selecting an image block constituted by a number of pixels around this pixel which is the center of said image block, such as an image block with a size of 4×4 or an image block with a size of 8×8; calculating respectively the luminance and the chrominance histogram statistics of the image block; and generating the image features of the preset fourth dimension according to the calculated histogram statistics, for example generating the image features of 200 dimensions.

The above-mentioned preset fourth dimension can be set according to actual applications, for example to 200 and is not limited by this application.

Figure 7:
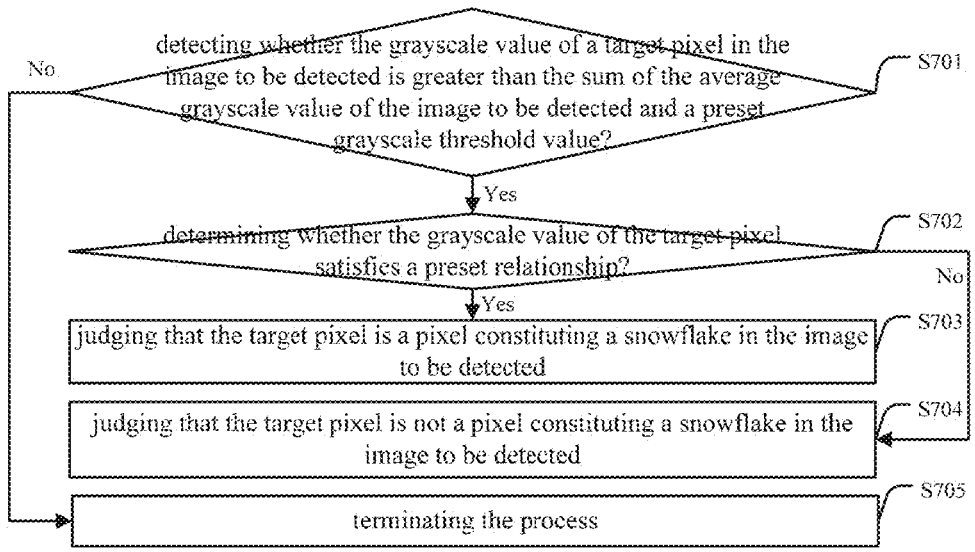
FIG. 7 is a schematic flow diagram of a method for detecting pixels constituting a snowflake provided by an embodiment of the present invention.

Specifically, referring to FIG. 7, which provides a flow diagram of a method for detecting the pixels constituting a snowflake, the method includes:

S701: detecting whether the grayscale value of a target pixel in the image to be detected is greater than the sum of the average grayscale value of the image to be detected and a preset grayscale threshold value. If yes, proceed with S702, otherwise, proceed with S705.

Wherein, the preset grayscale threshold value is greater than zero.

S702: determining whether the grayscale value of the target pixel satisfies a preset relationship. If yes, proceed with S703, if not, proceed with S704.

Wherein, the above-mentioned preset relationship is: the grayscale value of a pixel whose distance from the target pixel is smaller than or equal to $\sqrt{2}N$ equals to the grayscale value of the target pixel, and the grayscale value of a pixel whose distance from the target pixel is larger than $\sqrt{2}N$ and smaller than or equal to $2\sqrt{2}N$ does not equal to the grayscale value of the target pixel, wherein N is a positive integer.

Preferably, in practical applications, value of N can be 1, in this case there are 8 pixels whose distance from the target pixel is smaller than or equal to $4\sqrt{2}N$ and there are 16 pixels whose distance from the target pixel is larger than f N and smaller than or equal to $2\sqrt{2}N$.

S703: judging that the target pixel is a pixel constituting a snowflake in the image to be detected.

S704: judging that the target pixel is not a pixel constituting a snowflake in the image to be detected.

S705: terminating the process.

As can be seen from above, in the solution provided by above-mentioned each embodiments, when extracting the image features with respect to the snowy day, a snowflake with features similar to the image noises in an image are fully taken into account, and the snowflake has a certain size and the color values of various pixels constituting a snowflake are the same or similar. Therefore, a better image feature extraction result can be obtained during the extraction of the image features with respect to the snowy day due to the targeted performance by implementing the solutions provided by various embodiments.

Figure 8:
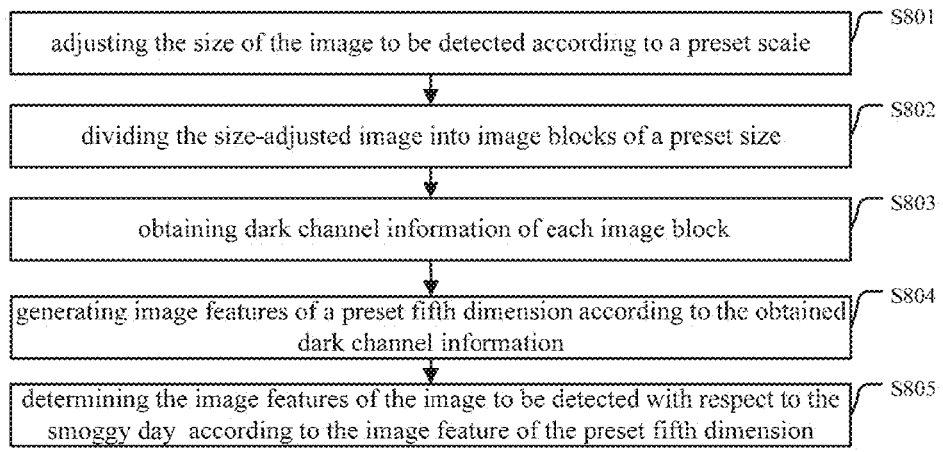
FIG. 8 is a schematic flow diagram of a method for extracting image features with respect to smoggy day provided by an embodiment of the present invention.

In another specific embodiment of the present invention, referring to FIG. 8, which provides a schematic flow diagram of a method for extracting image features with respect to the smoggy day, it should be understood that the overall tone of the image is relatively low and the definition of the image is poor.

Regarding the description above, in this embodiment, extracting image features of the image to be detected with respect to the smoggy day in the case that the preset types of weather comprise the rainy day may include:

S801: adjusting the size of the image to be detected according to a preset scale.

Wherein, the preset scale may be greater than, less than or equal to 1. If the preset scale is equal to 1, the image to be detected will not be adjusted. If the preset scale is less than 1, the size of the image to be detected will be reduced. In this way, the amount of calculation is reduced and the processing speed is improved.

For example, adjust the image size from 1920×1080 to 600×450.

S802: dividing the size-adjusted image into image blocks of a preset size.

The above-mentioned preset size can be set according to actual applications, for example to a size of 15×15.

S803: obtaining dark channel information of each image block.

After analyzing a number of images taken on a smoggy day, it is found that in most local non-sky areas, some pixels always have at least one color channel that has a very low value, which means that the minimum value of the light intensity in this local area is relatively small. Therefore in this embodiment, the dark channel information of the image is used as the image feature of the image taken on a smoggy day.

Taking an image J stored in RGB format for example, the dark channel information can be defined as follows:

$$J^{dark}(x) = \min_{y \in \Omega(x)} \left[ \min_{c \in \{r,g,b\}} J^c(y) \right]$$

where $J^c$ represents each color channel of the colored image, $\Omega(x)$ represents a window with the pixel x as its center.

S804: generating image features of a preset fifth dimension according to the obtained dark channel information.

The above-mentioned preset fifth dimension can be set according to actual situations, for example to 120, which is not limited by the present application.

Specifically, the mean of dark channel information of each image block can be calculated according to the obtained dark channel information to generate the image features of the preset fifth dimension.

S805: determining the image features of the image to be detected with respect to the smoggy day according to the image features of the preset fifth dimension.

As can be seen from above, in the solutions provided by above-mentioned each embodiments, when extracting the image features with respect to the smoggy day, the characteristics of the image taken on a smoggy day, such as low tone and poor definition of the image are fully taken into account. A better extraction of the image features with respect to the smoggy day can be obtained. Therefore, a better image feature extraction result can be obtained during the extraction of the image features with respect to the smoggy day due to the targeted performance by implementing the solutions provided by various embodiments.

The generating the preset multi-kernel classifier is described below by way of a detailed example.

Suppose that $D_L = \{x_i, y_i\}^V = t$ is an image training set formed by the first preset number N of images, wherein, $x_i$ represents the image features of the i-th image, $y_i$ represents the class label of $x_i$, i.e., the weather type of the i-th image such as clear day, rainy day and the like. To train and obtain a multi-kernel classifier for predicting the weather in which an unmarked image was taken, it is necessary to at first determine the optimal kernel function. The linear combination of some basic kernel functions can be used in determining the optimal kernel function.

For example, the optimal kernel function based on linear combination of basic kernel functions can be expressed as follows:

$$k(x_i, x) = \sum_{m=1}^{M} \beta_m k_m(x_i, x),$$

where x represents an image feature set of all the images in the above-mentioned image training set, $k(x_i, x)$ represents the optimal kernel function corresponding to $x_i$ in x. $\beta_m$ represents the linear combination coefficient, $\sum_{m=1}^{M} \beta_m = 1$, and $\beta_m \geq 0$. M represents the number of the kernel functions included in the optimal kernel function and the value of M is related to the types of the image features used in the image detection, for example, if the image features of the image to be detected with respect to the clear day, a rainy day, a snowy day and a smoggy day are used in the image detection, the value of M is 4. $k_m(x)$ represents the m-th kernel function and $k_m(x_i, x)$ represents the m-th kernel function corresponding to $x_i$ in x.

Suppose that the decision function corresponding to any image feature x of an image in the image training set is:

$$f(x) = \sum_{m=1}^{M} \beta_m k_m(x)\alpha + b,$$

where α and b are the inherent parameters of SVM classifier.

Specifically, the target function can be defined as:

$$\min_{\beta,\alpha,b} J = \frac{1}{2}\sum_{m=1}^{M} \beta_m \alpha^T K_m \alpha + C\sum_i \xi_i,$$

where $K_m = k_m(x)$, C is the trade-off parameter, $\xi_i$ represents the slack variable.

The constraints of the target function are:

$$y_i * \sum_{m=1}^{M} \beta_m k_m(x_i)\alpha + y_i b \geq 1 - \xi_i, \forall i$$

$$\xi_i \geq 0, \forall i$$

Gradient descent optimization algorithm is employed for iterative calculation, and α and b are obtained by a given weight $\beta_m$ in each iteration. Thus, a multi-class problem can be transformed into a number of associated two-class problems by the one-against-all strategy.

Suppose that there are P types of weather, P represents the number of the weather type. For example, if the type of weather includes clear day, rainy day, snowy day and smoggy day, the value of P is 4, then the target function can be transformed as follows:

$$J = \sum_{p=1}^{P} J_p(\beta, \alpha_p, b_p),$$

where Jp is the p-th two-class classifier, whose positive samples are the weather belonging to the weather type p and negative samples are the weather not belonging to the weather type p. β represents the set of linear combination coefficients of the kernel functions, $\alpha_p$ represents the value of α for the weather type p. $b_p$ represents the value of b for the weather type p. The type of test weather is determined as follows.

$$y = \underset{y_p}{\mathrm{argmax}} F_p(x)$$

where $F_p(x)$ is the specific function of f(x) when the weather type is p.

The above is only a way to obtain a preset multi-kernel classifier, and there are still many other ways in practical applications, which will not further described in detail.

Corresponding to the above-mentioned weather recognition method based on the image information detection, the embodiments of the present invention also provide a weather recognition device based on the image information detection.

Figure 9:
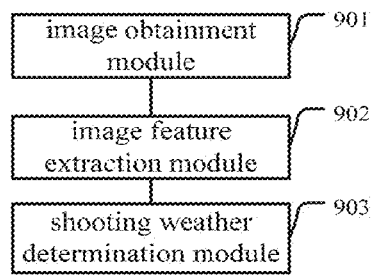
FIG. 9 is a schematic structural diagram of a weather recognition device based on image information detection provided by an embodiment of the present invention.

FIG. 9 shows the structural diagram of weather recognition device based on image information detection provided by the embodiments of the present invention, including: an image obtainment module 901, an image feature extraction module 902 and a shooting weather determination module 903.

Wherein, the image obtainment module 901 is used to obtain an image to be detected;

the image feature extraction module 902 is used to extract multiple first image features of the image to be detected with respect to each preset type of weather according to a number of the first preset algorithms preset correspondingly for different preset types of weather;

the shooting weather determination module 903 is used to input the extracted multiple first image features to a preset multi-kernel classifier, the multi-kernel classifier performing classification according to the inputted image features to identify the weather in which the image to be detected was taken;

wherein, the multi-kernel classifier is a classifier for the preset types of weather realized by: selecting a first preset number of image samples for the different preset types of weather in which the image to be detected was taken respectively; and for the image samples of each preset type of weather respectively, extracting the first image features of each image sample according to the first preset algorithm which corresponds to this preset type of weather; and performing machine learning for the extracted first image features according to a preset multi-kernel learning algorithm.

Specifically, the preset types of weather include at least one of the following: clear day, rainy day, snowy day and smoggy day.

As can be seen from above, in the solutions provided by this embodiment, the classifier for the preset types of weather is realized in advance by: selecting the first preset number of image samples for the different preset types of weather in which the image was taken respectively; for the image samples of each preset type of weather respectively, extracting the first image features of each image sample according to the first preset algorithm which corresponds to this preset type of weather; and then performing machine learning for the extracted first image features according to the preset multi-kernel learning algorithm. Therefore, the weather in which the image to be detected can be identified according to the above-mentioned classifier after the image features of the image to detected with respect to each preset type of weather are extracted. Therefore, it can facilitate the corresponding processing in further applications according to the identified weather.

In a specific embodiment of the present invention, which provides another structural schematic diagram of weather recognition device based on image information detection, compared with the previous embodiment, this embodiment also includes:

an image feature obtainment module, which is used to obtain second image features of the image to be detected with respect to image contrast and/or image saturation according to second preset algorithms, after the image to be detected is obtained by the image obtainment module 901;

The device may also include a classifier obtainment module for obtaining a multi-kernel classifier.

Specifically, the classifier obtainment module may include:

A first image feature extraction sub-module, which is used to select a first preset number of image samples for the different preset types of weather in which the image was taken respectively; and for the image samples of each preset type of weather respectively, extract the first image features of each image sample according to the first preset algorithm which corresponds to this preset type of weather;

A second image feature extraction sub-module, which is used to obtain second image features with respect to image contrast and/or image saturation of the each selected image sample respectively according to second preset algorithms:

A machine learning sub-module, which is used to perform machine learning for the extracted first image features and for the obtained second image features according to a preset multi-kernel learning algorithm to obtain a multi-kernel classifier for the preset types of weather.

As can be seen from above, in the solutions provided by the present embodiment, in addition to the influence of the weather type on the image to be detected, image contrast and/or saturation is also taken into account in the recognition of the weather in which the image to be detected was taken. Therefore, more information is provided to identify the weather in which the image to be detected was taken.

Alternatively, the image feature extraction module 902 may include: a clear day image feature extraction sub-module, a rainy day image feature extraction sub-module, a snowy day image feature extraction sub-module and a smoggy day image feature extraction sub-module (which are not shown in the figures).

Specifically, the clear day image feature extraction sub-module is used to extract image features of the image to be detected with respect to the clear day in the case that the preset types of weather include clear day.

The clear day image feature extraction sub-module may include:

a sky area detection unit, which is used to detect a sky area of the image to be detected;

a color information extraction unit, which is used to extract color information of the detected sky area;

a first image feature generation unit, which is used to generate image features of a preset first dimension based on the extracted color information;

a clear day image feature determination unit, which is used to determine the image features of the image to be detected with respect to the clear day according to the image features of the preset first dimension.

In one specific implementation of the present invention, the clear day image feature extraction sub-module may also include:

a shaded area detection unit, which is used to detect a shaded area of the image to be detected;

a first shaded area selection unit, which is used to select a second preset number of shaded areas from the detection results, wherein the second preset number is equal to the number of shaded areas contained in a pre-built set of shaded areas, which is built based on the pre-selected shaded areas with strong contrast;

a first shaded area search unit, which is used to search a pre-built set of shaded areas for a adjacent shaded area of each selected shaded area;

a distance calculation unit, which is used to calculate the average distance between the selected shaded area and the searched adjacent shaded area thereof;

a second image feature generation unit, which is used to generate image features of a preset second dimension according to the calculation result.

a clear day image feature determination unit, which is used to determine the image features of the image to be detected with respect to the clear day according to the image features of the preset first dimension and those of the preset second dimension.

Specifically, the rainy day image feature extraction sub-module extracts the image features of the image to be detected with respect to the rainy day in the case that the preset types of weather comprise the rainy day.

The rainy day image feature extraction sub-module may include:

a high-frequency information obtainment unit, which is used to obtain high-frequency component information of the image to be detected according to a preset guided-filtering algorithm;

a binarization processing unit, which is used to perform a binarization processing of the obtained high-frequency component information;

a HOG feature extraction unit, which is used to extract HOG features of a gradient histogram of the high-frequency component information after the binarization processing;

a HOG feature matching unit, which is used to match the extracted HOG features with templates in a preset HOG template set to obtain respective matching degrees according to a preset template sliding rule;

a HOG feature selection unit, which is used to select HOG features corresponding to a third preset number of matching degrees from the extracted HOG features according to the matching results based on a descending order in which the matching degrees are arranged;

a third image feature generation unit, which is used to generate image features of a preset third dimension according to the selected HOG features;

a rainy day image feature determination unit, which is used to determine the image features of the image to be detected with respect to the rainy day according to the image features of the preset third dimension.

Specifically, the snowy day image feature extraction sub-module is used to extract image features of the image to be detected with respect to the snowy day in the case that the preset types of weather comprise the snowy day.

The snowy day image feature extraction sub-module may include:

a pixel detection unit, which is used to detect pixels constituting a snowflake in the image to be detected;

a fourth image feature generation unit, which is used to generate image features of a preset fourth dimension according to the detected pixels constituting a snowflake;

a snowy day image feature determination unit, which is used to determine the image features of the image to be detected with respect to the snowy day according to the image features of the preset fourth dimension;

wherein, the pixel detection unit may include a grayscale value detection subunit and a grayscale value judging subunit.

Wherein, the grayscale value detection subunit is used to detect whether the grayscale value of a target pixel in the image to be detected is greater than the sum of the average grayscale value in the image to be detected and a preset grayscale threshold value, if yes, the grayscale value judging subunit is triggered to judge the grayscale value;

wherein, the grayscale value judging subunit is used to judge whether the grayscale value of the target pixel satisfies the following relationship:

the grayscale value of a pixel whose distance from the target pixel is smaller than or equal to $\sqrt{2}N$ equals to the grayscale value of the target pixel, and the grayscale value of a pixel whose distance from the target pixel is larger than $\sqrt{2}N$ and smaller than or equal to $2\sqrt{2}N$ does not equal to the grayscale value of the target pixel, wherein N is a positive integer; if the relationship above is satisfied, it can be judged that the target pixel is the pixel constituting a snowflake in the image to be detected; if not, it can be judged that the target pixel is not the pixel constituting a snowflake in the image to be detected Specifically, the smoggy day image feature extraction sub-module is used to extract image features of the image to be detected with respect to the smoggy day in the case that the preset types of weather comprise the smoggy day.

The smoggy day image feature extraction sub-module may include:

an image size adjustment unit, which is used to adjust the size of the image to be detected according to a preset scale;

an image block division unit, which is used to divide the size-adjusted image into image blocks of a preset size;

a dark channel information obtainment unit, which is used to obtain dark channel information of each image block;

a fifth image feature generation unit, which is used to generate image features of a preset fifth dimension based on the obtained dark channel information;

a smoggy day image feature determination unit, which is used to determine the image features of the image to be detected with respect to the smoggy day according to the image features of the preset fifth dimension.

Preferably, the fifth image feature generation unit may include:

a dark channel information mean calculation sub-unit, which is used to calculate the mean of dark channel information of each image block according to the obtained dark channel information.

a fifth image feature generation subunit, which is used to generate image features of a preset fifth dimension according to the mean of dark channel information of each image block.

The embodiments of the device are briefly described and the description of the embodiments of the method can be referred for its related contents since the embodiments of the device are substantially similar to those of the method.

It should be noted that the relationship terms herein such as "first", "second" and the like are only used to distinguish one entity or operation from another entity or operation, but do not necessarily require or imply that there is actual relationship or order between these entities or operations. Moreover, the terms "include", "comprise" or any variants thereof are intended to cover a non-exclusive inclusion, such that processes, methods, articles or devices comprising a series of elements not only comprise those elements listed, but also comprise other elements not specifically listed or the elements intrinsic to these processes, methods, articles, or devices. Without further limitations, elements limited by the wording "comprise(s) a/an . . . " do not exclude that there are additional identical elements in the processes, methods, articles, or devices, which comprise the listed elements.

It will be understood by one of ordinary skills in the art that all or part of the steps in the embodiments which implement the method described above can be implemented by instructing the related hardware with programs, which programs can be stored in a computer readable storage medium such as ROM/RAM, magnetic disk, optical disk.

The embodiments described above are just preferable embodiments of the present invention, and are not indented to limit the protection scope of the present invention. Any modifications, alternatives, improvements or the like within the spirit and principle of the present invention are included in the protection scope of the present invention.

What is claimed is:

1. A weather recognition method performed by a device based on image information detection, wherein the device comprises a processor, and the processor performs the steps of:

obtaining an image to be detected;

extracting multiple sets of first image features of the image to be detected with respect to different preset types of weather according to a number of first preset algorithms preset correspondingly for the different preset types of weather, wherein the preset types of weather comprise at least one of the following: clear day, rainy day, snowy day and smoggy day, each of which corresponds to a set of image features, and extracting image features of the image to be detected with respect to the clear day in the case that the preset types of weather comprise the clear day comprises:

detecting a sky area in the image to be detected, extracting color information of the detected sky area, generating image features of a preset first dimension according to the extracted color information, determining the image features of the image to be detected with respect to the clear day according to the image features of the preset first dimension;

extracting image features of the image to be detected with respect to the rainy day in the case that the preset types of weather comprise the rainy day comprises:

obtaining high-frequency component information of the image to be detected according to a preset guided-filtering algorithm, performing a binarization processing for the obtained high-frequency component information, extracting HOG, Histogram of Oriented Gradient, features of the high-frequency component information after the binarization processing, matching templates in a preset HOG template set with the extracted HOG features according to a preset template sliding rule to obtain respective matching degrees, selecting HOG features corresponding to a third preset number of matching degrees from the extracted HOG features according to the matching results based on a descending order in which the matching degrees are arranged, generating image features of a preset third dimension according to the selected HOG features, determining the image features of the image to be detected with respect to the rainy day according to the image features of the preset third dimension;

extracting image features of the image to be detected with respect to the snowy day in the case that the preset types of weather comprise the snowy day comprises:

detecting pixels constituting a snowflake in the image to be detected, generating image features of a preset fourth dimension according to the detected pixels constituting a snowflake, determining the image features of the image to be detected with respect to the snowy day according to the image features of the preset fourth dimension;

extracting image features of the image to be detected with respect to the smoggy day in the case that the preset types of weather comprise the smoggy day comprises:

adjusting the size of the image to be detected according to a preset scale, dividing the size-adjusted image into image blocks of a preset size, obtaining dark channel information of each image block, generating image features of a preset fifth dimension according to the obtained dark channel information, determining the image features of the image to be detected with respect to the smoggy day according to the image features of the preset fifth dimension;

inputting the extracted multiple sets of first image features to a preset multi-kernel classifier, and performing classification according to the inputted image features by means of the multi-kernel classifier and identifying the weather in which the image to be detected was taken by determining whether the data contained in the set of image features corresponding to a type of weather are within a preset range for this type of weather, wherein among the preset types of weather, the data contained in the set of image features corresponding to the same type of weather as the weather in which the image to be detected was taken are within the preset range for this type of weather, while the sets of image features corresponding to other types of weather are not within respective preset range for these types of weather;

wherein the multi-kernel classifier is a classifier for the preset types of weather realized by: selecting a first preset number of image samples for the different preset types of weather in which the image was taken respectively; and for the image samples of each preset type of weather respectively, extracting the first image features of each image sample according to the first preset algorithm which corresponds to this preset type of weather; and performing machine learning for the extracted first image features according to a preset multi-kernel learning algorithm, after obtaining the image to be detected, the method further includes:

obtaining second image features of the image to be detected with respect to image contrast and/or image saturation according to second preset algorithms;

the multi-kernel classifier is realized by:

selecting the first preset number of image samples for the different preset types of weather in which the image was taken respectively; and for the image samples of each preset type of weather respectively, extracting the first image features of each image sample according to the first preset algorithm which corresponds to this preset type of weather;

obtaining the second image features of each of the selected image samples with respect to image contrast and/or image saturation, respectively, according to the second preset algorithms; and performing machine learning for the extracted first image features and for the obtained second image features according to the preset multi-kernel learning algorithm to realize the multi-kernel classifier for the preset types of weather.

2. The method of claim 1, wherein in the case that the preset types of weather comprise the clear day, the method further comprises:

detecting a shaded area in the image to be detected;

selecting a second preset number of shaded areas from the detection results, wherein the second preset number is equal to the number of shaded areas contained in a pre-built set of shaded areas, which is built based on the pre-selected shaded areas with strong contrast;

searching the pre-built set of shaded areas for an adjacent shaded area of each selected shaded area;

calculating the average distance between the selected shaded area and the searched adjacent shaded area thereof;

generating image features of a preset second dimension according to the calculated average distance;

the determining the image features of the image to be detected with respect to the clear day according to the image features of the preset first dimension includes:

determining the image features of the image to be detected with respect to the clear day according to the image features of the preset first dimension and the image features of the preset second dimension.

3. The method of claim 1 wherein in the case that the preset types of weather comprise the snowy day, detecting the pixels constituting a snowflake in the image to be detected includes:

detecting whether the grayscale value of a target pixel in the image to be detected is greater than the sum of the average grayscale value of the image to be detected and a preset grayscale threshold value;

if yes, judging whether the grayscale value of the target pixel satisfies the following relationship:

the grayscale value of a pixel whose distance from the target pixel is smaller than or equal to $\sqrt{2}N$ equals to the grayscale value of the target pixel, and the grayscale value of a pixel whose distance from the target pixel is larger than $\sqrt{2}N$ and smaller than or equal to $2\sqrt{2}N$ does not equal to the grayscale value of the target pixel, wherein N is a positive integer;

if the relationship above is satisfied, the target pixel is considered to be a pixel constituting a snowflake in the image to be detected;

if the relationship above is not satisfied, the target pixel is considered not to be a pixel constituting a snowflake in the image to be detected.

4. The method of claim 1 wherein generating image features of a preset fifth dimension according to the obtained dark channel information includes:

calculating the mean of the dark channel information of each image block according to the obtained dark channel information;

generating the image features of the preset fifth dimension according to the mean of the dark channel information of each image block.

5. A weather recognition device based on image information detection, characterized in that the device includes:

a processor and a non-transitory memory, wherein a plurality of executable modules including an image obtainment module, an image feature extraction module and a shooting weather determination module are stored in the memory, which are executable by the processor to performing weather recognition; wherein the image obtainment module is executed to obtain an image to be detected;

the image feature extraction module is executed to extract multiple sets of first image features of the image to be detected with respect to different preset types of weather according to a number of first preset algorithms preset correspondingly for the different preset types of weather, wherein the preset types of weather comprise at least one of the following: clear day, rainy day, snowy day and smoggy day, each of which corresponds to a set of image features, and extracting image features of the image to be detected with respect to the clear day in the case that the preset types of weather comprise the clear day comprises:
detecting a sky area in the image to be detected,
extracting color information of the detected sky area,
generating image features of a preset first dimension according to the extracted color information,
determining the image features of the image to be detected with respect to the clear day according to the image features of the preset first dimension;

extracting image features of the image to be detected with respect to the rainy day in the case that the preset types of weather comprise the rainy day comprises:
obtaining high-frequency component information of the image to be detected according to a preset guided-filtering algorithm,
performing a binarization processing for the obtained high-frequency component information,
extracting HOG, Histogram of Oriented Gradient, features of the high-frequency component information after the binarization processing,
matching templates in a preset HOG template set with the extracted HOG features according to a preset template sliding rule to obtain respective matching degrees,
selecting HOG features corresponding to a third preset number of matching degrees from the extracted HOG features according to the matching results based on a descending order in which the matching degrees are arranged,
generating image features of a preset third dimension according to the selected HOG features,
determining the image features of the image to be detected with respect to the rainy day according to the image features of the preset third dimension;

extracting image features of the image to be detected with respect to the snowy day in the case that the preset types of weather comprise the snowy day comprises:
detecting pixels constituting a snowflake in the image to be detected,
generating image features of a preset fourth dimension according to the detected pixels constituting a snowflake,
determining the image features of the image to be detected with respect to the snowy day according to the image features of the preset fourth dimension;

extracting image features of the image to be detected with respect to the smoggy day in the case that the preset types of weather comprise the smoggy day comprises:
adjusting the size of the image to be detected according to a preset scale,
dividing the size-adjusted image into image blocks of a preset size,
obtaining dark channel information of each image block,
generating image features of a preset fifth dimension according to the obtained dark channel information,
determining the image features of the image to be detected with respect to the smoggy day according to the image features of the preset fifth dimension;

the shooting weather determination module is executed to input the extracted multiple sets of first image features to a preset multi-kernel classifier, and perform classification according to the inputted image features by means of the multi-kernel classifier and identify the weather in which the image to be detected was taken by determining whether the data contained in the set of image features corresponding to a type of weather are within a preset range for this type of weather, wherein among the preset types of weather, the data contained in the set of image features corresponding to the same type of weather as the weather in which the image to be detected was taken are within the preset range for this type of weather, while the sets of image features corresponding to other types of weather are not within respective preset range for these types of weather;

wherein the multi-kernel classifier is a classifier for the preset types of weather realized by: selecting a first preset number of image samples for the different preset types of weather in which the image was taken respectively; and for the image samples of each preset type of weather respectively, extracting the first image features of each image sample according to the first preset algorithm which corresponds to this preset type of weather; and performing machine learning for the extracted first image features according to a preset multi-kernel learning algorithm;

after obtaining the image to be detected, the image feature extraction module is further executed to:

obtain second image features of the image to be detected with respect to image contrast and/or image saturation according to second preset algorithms;

the multi-kernel classifier is realized by:
selecting the first preset number of image samples for the different preset types of weather in which the image was taken respectively; and for the image samples of each preset type of weather respectively, extracting the first image features of each image sample according to the first preset algorithm which corresponds to this preset type of weather;
obtaining the second image features of each of the selected image samples with respect to image contrast and/or image saturation, respectively, according to the second preset algorithms;
performing machine learning for the extracted first image features and for the obtained second image features according to the preset multi-kernel learning algorithm to realize the multi-kernel classifier for the preset types of weather.

* * * * *